United States Patent
Cook

[19]

[11] Patent Number: 6,074,140
[45] Date of Patent: Jun. 13, 2000

[54] QUICK-RELEASE CHUCK ASSEMBLY

[75] Inventor: Roy P. Cook, Temecula, Calif.

[73] Assignee: Banner American Products, Inc., Temecula, Calif.

[21] Appl. No.: 09/350,578

[22] Filed: Jul. 9, 1999

[51] Int. Cl.[7] .......................... B23B 31/22; B23B 31/28; B23B 31/30
[52] U.S. Cl. ................ 408/240; 279/4.04; 279/4.06; 279/75; 279/150; 279/905
[58] Field of Search .................... 279/4.04, 4.06, 279/74, 75, 150, 902, 904, 905; 408/240, 241 R; 433/127, 128

[56] References Cited

U.S. PATENT DOCUMENTS

| | | | |
|---|---|---|---|
| 3,732,026 | 5/1973 | Peters | 408/240 |
| 4,203,222 | 5/1980 | Mattchen | 279/4.06 |
| 4,620,539 | 11/1986 | Andrews et al. | 279/150 |
| 4,669,932 | 6/1987 | Hartley | 279/902 |
| 5,028,181 | 7/1991 | Jenkins et al. | 408/240 |
| 5,037,299 | 8/1991 | Nakanishi | 433/128 |
| 5,470,180 | 11/1995 | Jore | 408/239 R |
| 5,584,689 | 12/1996 | Loge | 433/128 |

FOREIGN PATENT DOCUMENTS 2117628  10/1972  Germany ................... 279/75

*Primary Examiner*—Steven C. Bishop
*Attorney, Agent, or Firm*—Loyal McKinley Hanson

[57] ABSTRACT

A handheld rotary power unit includes a housing with a handle and a distal end portion, a motor shaft extending through the distal end portion of the housing, and a quick-release chuck assembly connected to the motor shaft. An actuator assembly is provided on the housing that enables a user to operate the quick-release chuck assembly with a hand of the user while that hand of the user is holding the handle portion of the housing. Actuator assembly examples include an electrically powered solenoid, a manually powered linkage, and a pneumatically powered piston.

2 Claims, 3 Drawing Sheets

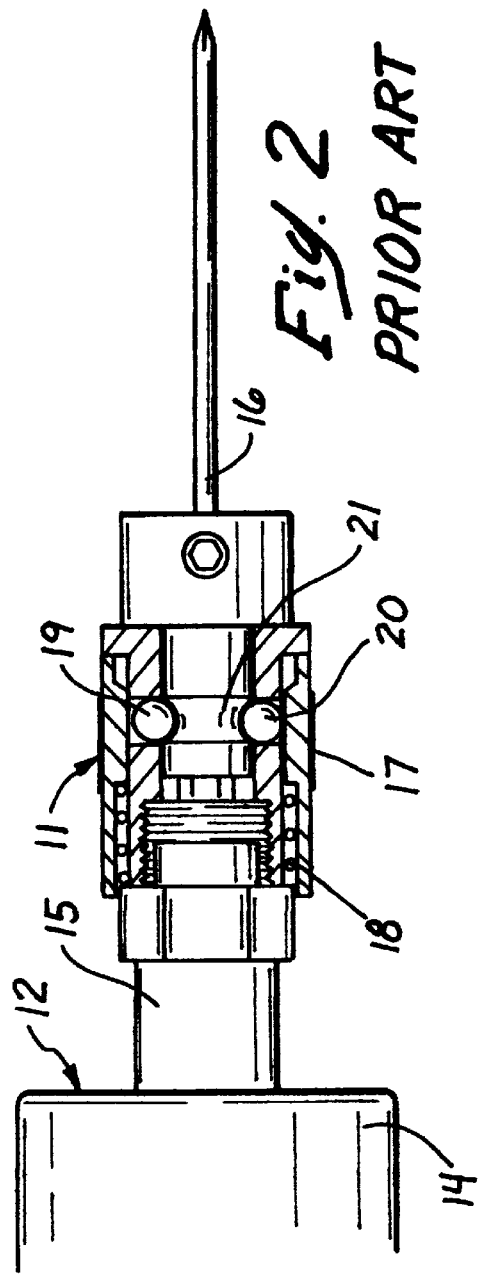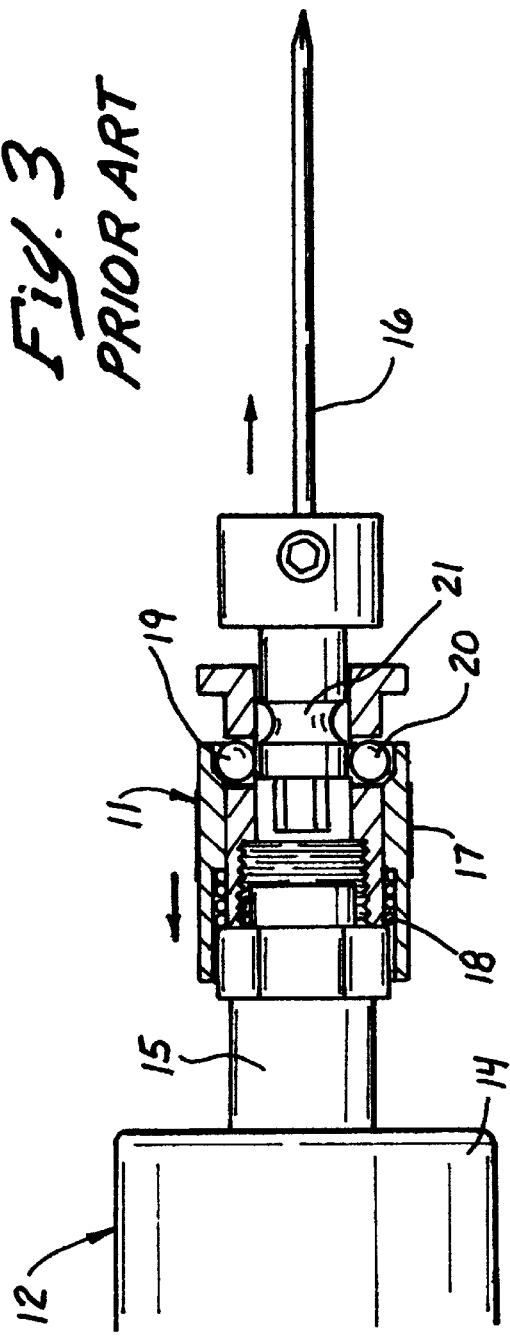

QUICK-RELEASE CHUCK ASSEMBLY

BACKGROUND OF THE INVENTION

1. Technical Field

This invention relates generally to hand tools, and more particularly to an electric drill or other handheld rotary power unit with a quick-release chuck assembly.

2. Description of Related Art

An existing electric drill, screwdriver, or other handheld rotary power unit often has a quick-release chuck assembly. A typical quick-release chuck assembly includes a sleeve that is spring biased in a locked position. The user slides the sleeve axially relative to the rest of the chuck assembly (e.g., forwardly) to an unlocked position, and then inserts or removes a screwdriver bit, drill bit, or other tool. Releasing the sleeve allows it to slide back to the locked position under influence of the spring biasing.

This arrangement is popular. It foregoes the need for a chuck key and the inconvenient and time-consuming task of keeping and using a chuck key. But certain problems remain. To better visualize one problem, consider in further detail the steps involved in removing a drill bit from the quick-release chuck assembly of an electric drill.

First, the user grasps the forward portion of the electric drill with one hand (e.g., his left hand) while placing the rearward or handle portion of the electric drill against his belt or torso. Holding the electric drill that way frees the user's right hand so that he can grasp the drill bit with it. Now, with the electric drill held against the belt or torso with the left hand and the drill bit grasped with the right hand, the user slides his left hand forwardly to grasp the sleeve portion of the chuck assembly. Then, he slides the sleeve forwardly to the unlocked position with his left hand while removing the drill bit with his right hand. After that, he releases the sleeve so that it can return to the rearward locked position. He can then proceed to insert a different drill bit in much the same way.

From the foregoing, one might say that the existing quick-release chuck assembly really requires three hands. The user requires one hand to hold the electric drill, a second hand to hold the drill bit, and a third hand to slide the sleeve. Placing the electric drill against the belt or torso enables the user to use just two hands, but operating the chuck that way is a somewhat cumbersome task. Thus, users need a better quick-release chuck assembly.

SUMMARY OF THE INVENTION

This invention addresses the concerns outlined above by providing a handheld rotary power unit having (i) a quick-release chuck assembly and (ii) a companion quick-release chuck actuator that is operable with a hand while that hand is holding the unit's handle. That arrangement enables the user to both hold the unit by its handle and operate the quick-release chuck with just one hand. The user need not prop the unit against his belt or torso. He can hold the unit apart from his body or other support and operate the quick-release chuck assembly by means of the quick-release chuck actuator with one hand while he inserts or removes the bit with the other hand.

To paraphrase some of the more precise language appearing in the claims, a handheld rotary power unit constructed according to the invention includes a housing, a motor shaft, and a quick-release chuck assembly. The housing has a handle portion and a distal end portion, the motor shaft extends distally from the distal end portion of the housing, and the quick-release chuck assembly is connected to the motor shaft. According to the major aspect of the invention, an actuator assembly is provided on the housing to function as means for enabling a user to operate the quick-release chuck assembly with a hand of the user while that hand of the user is holding the handle portion of the housing.

Actuator assembly examples include an electrically powered solenoid, a manually powered linkage, and a pneumatically powered piston. Regardless of those details, the quick-release chuck assembly of this invention is far less cumbersome to operate. The following illustrative drawings and detailed description make the foregoing and other objects, features, and advantages of the invention more apparent.

BRIEF DESCRIPTION OF THE DRAWINGS

FIG. 2 is an enlarged side view of a portion of the prior art drill with portions of the quick-release chuck in cross section and the chuck in a locked forward position;

FIG. 3 is a side view of the prior art drill that is similar to FIG. 2, but with the chuck in an unlocked rearward position;

DESCRIPTION OF THE PREFERRED EMBODIMENTS

Figure 1:
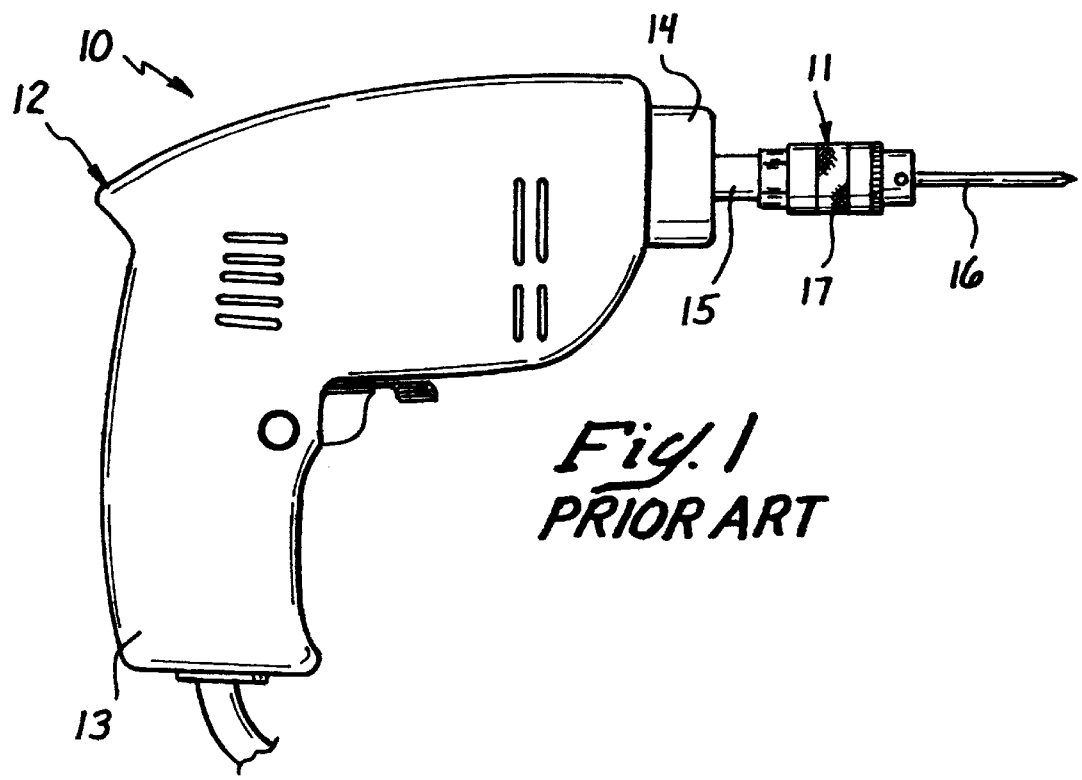
FIG. 1 of the drawings is a side view of a drill constructed according to the prior art with a quick-release chuck.

FIGS. 1–3 of the drawings show various aspects of a handheld rotary power unit in the form of an electric drill 10 with a quick-release chuck assembly 11 constructed according to the prior art. The drill 10 includes a housing 12 with a handle portion 13 and a distal end portion 14. A motor within the housing 12 (not shown) includes a motor shaft 15 (i.e., a motor driven shaft) that extends distally (i.e., forwardly) from the distal end portion 14 to the quick-release chuck assembly 11 (FIGS. 1–3). The quick-release chuck assembly 11 is mounted on the motor shaft 15 and operates in a known way to hold a drill bit 16 (i.e., a drill bit assembly) as the user grasps the handle portion 13 and directs the drill bit 16 toward an object he is wants to drill (not shown).

The quick-release chuck assembly 11 is commonly referred to as a quick-release chuck assembly because it includes a sleeve 17 that the user can manually grasp and slide axially in order to quickly remove the drill bit 16 and replace it with a different bit. As used in the claims, the term "quick-release chuck assembly" is intended to have that meaning. The user slides the sleeve 17 axially under resistance of a spring 18 from a locked position of the sleeve 17 to an unlocked position of the sleeve 17. Releasing the sleeve 17 allows it to move back to the locked position under influence of the spring 18. For the illustrated chuck assembly 11, the locked position is forwardly disposed as illustrated in FIG. 2 and the unlocked position is rearwardly disposed as illustrated in FIG. 3, although some quick-release chuck assemblies work just the opposite (locked and spring biased rearwardly and unlocked forwardly). The claims are intended to cover both arrangements.

In the locked position, ball bearings 19 and 20 are disposed radially inwardly into an annular groove 21 in the drill bit 16. The sleeve 17 holds them there. Additional ball bearings are also so disposed, but they are not visible in FIG. 1. In the unlocked position, the ball bearings 19 and 20 are free to move radially outwardly to the positions shown in FIG. 2, and that frees the drill bit 16 for removal. Installation of another drill bit proceeds by holding the sleeve 17 rearwardly in the unlocked position, inserting the drill bit, and then releasing the sleeve 17 so that it moves forwardly to the locked position under influence of the spring 18.

From the above, one can see that the user must hold the drill 10 and operate the sleeve with one hand while holding the drill bit 16 with the other hand. That can be somewhat cumbersome to do, requiring that the user cradle the drill 10 with one arm, or prop it against his belt or torso.

Figure 4:
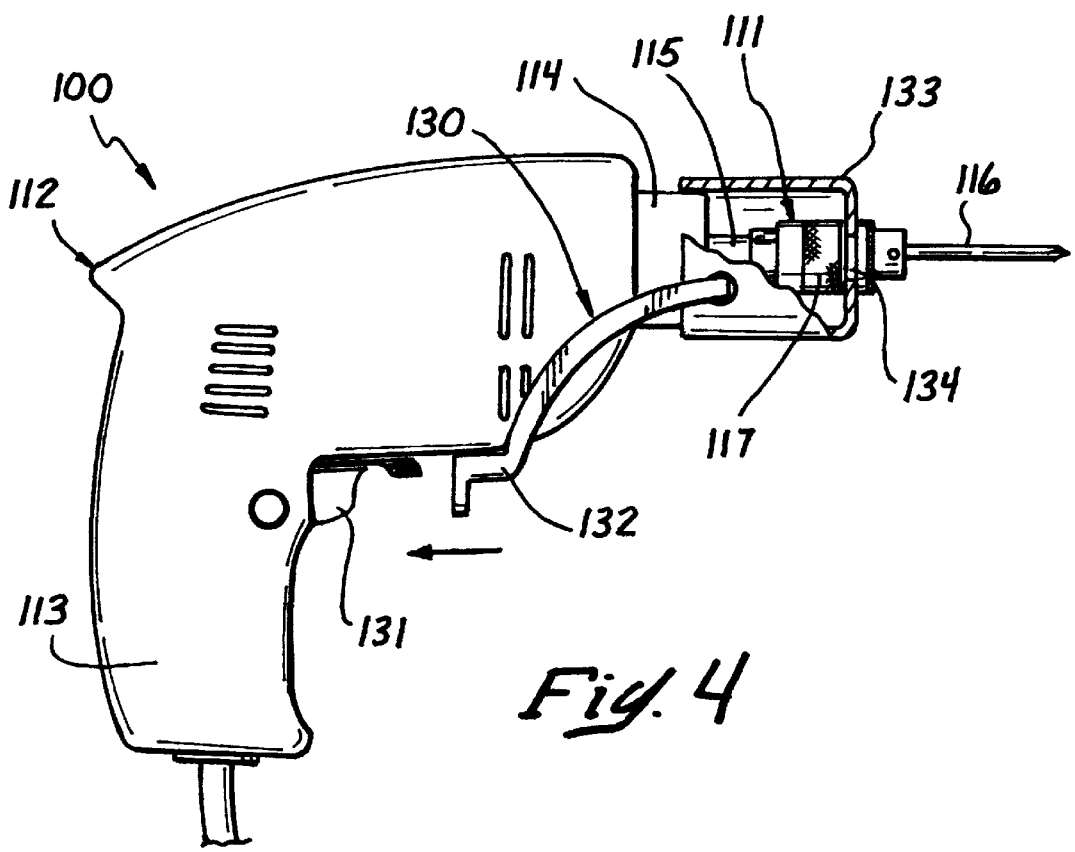
FIG. 4 is a side view of a drill constructed according to the invention with a mechanical quick-release chuck actuator.

FIG. 4 shows a rotary power unit 100 constructed according to the invention. It is similar in many respects to the drill 10 and so only differences are described in further detail. For convenience, reference numerals designating parts of the rotary power unit 100 are increased by one hundred over those designating parts of the drill 10.

The major difference is that the rotary power unit 100 includes an actuator assembly 130 on the housing 112 that functions as means for enabling a user to operate the quick-release chuck assembly 111 with a hand of the user while that hand of the user is holding the handle portion 113 of the housing 112. The actuator assembly 130 includes means for enabling a user to do so manually. While holding the handle portion 113 in one of his hands, the user moves his index finger of that hand forwardly of a conventional trigger 131 on the rotary power unit 100 to a linkage member 132. The linkage member 132 is sized and attached to the housing 112 by suitable known means (not shown) so that it is within reach of the index finger of the user's hand while that hand continues to hold the handle portion 113.

In addition, the linkage member 132 is connected to a coupling member 133 that engages the sleeve 117 of the quick-release chuck assembly 111. The sleeve 117 is provided with an annular groove 134 into which the coupling member 132 extends for purposes of engaging the sleeve 117 and moving it axially while still enabling the sleeve 117 to rotate with the motor shaft 115. The user moves the linkage member 132 rearwardly by pulling on it with his index finger. That moves the coupling member 133 rearwardly to thereby move the sleeve 117 rearwardly to the unlocked position. Releasing it allows it to move forwardly back to the locked position under influence of a spring. Based upon the foregoing and subsequent descriptions, one of ordinary skill in the art can readily design a suitable mechanical linkage and coupling arrangement to implement this aspect of the invention.

Figure 5:
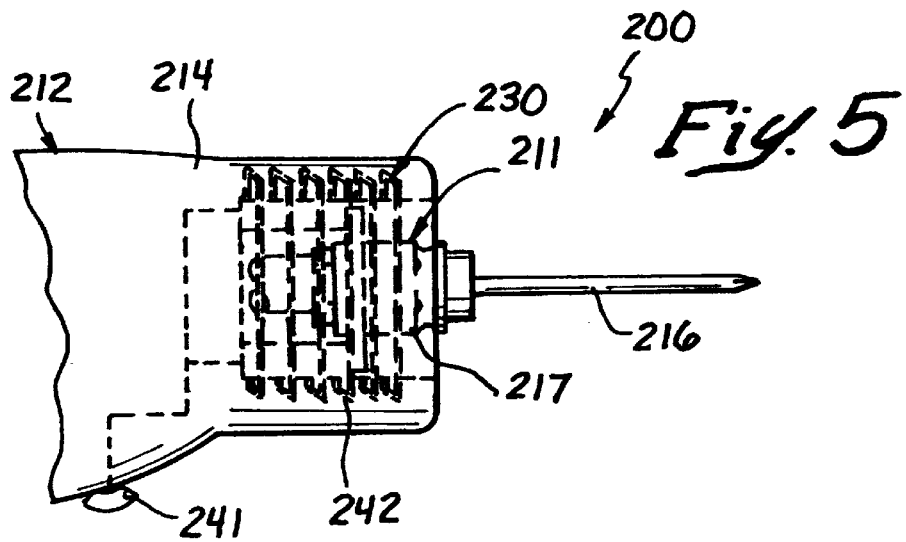
FIG. 5 is a side view of a forward portion of second drill constructed according to the invention with an electrical quick-release chuck actuator.

FIG. 5 shows a forward portion of another rotary power unit 200 constructed according to the invention. It is similar in many respects to the rotary power unit 100 and so only differences are described in further detail. For convenience, reference numerals designating parts of the rotary power unit 200 are increased by one hundred over those designating parts of the rotary power unit 100. The entire housing 212 is not shown for illustrative convenience because its handle portion trigger, and related construction details are similar to those of the rotary power unit 100 in all germane respects.

The major difference is that the actuator assembly 230 of the rotary power unit 200 includes electrically powered means for enabling the user to operate the sleeve 217 of the quick-release chuck assembly 211 with a hand of the user while that hand of the user is holding the handle portion of the housing 212. The electrically powered means includes a switch 241 that the user manually actuates to connect electric power to a solenoid arrangement 242 within the distal end portion 214 of the housing 212. The switch 241 is located on the housing 212 in a position such that the user can operate it with the index finger of his hand while that hand holds the handle portion of the housing 212. The solenoid arrangement 242 and its electrical connection to the switch 241 are shown diagrammatically in FIG. 5. The solenoid arrangement 242 is adapted to magnetically attract and thereby move the sleeve 217 to the unlocked position when the user actuates the switch 241. Of course, a solenoid arrangement can be provided that magnetically attracts a moveable solenoid core that is coupled mechanically to the sleeve 217, and it is intended that such variations fall within the scope of the related claims. Based upon the foregoing and subsequent descriptions, one of ordinary skill in the art can readily design a suitable solenoid arrangement to implement this aspect of the invention.

Figure 6:
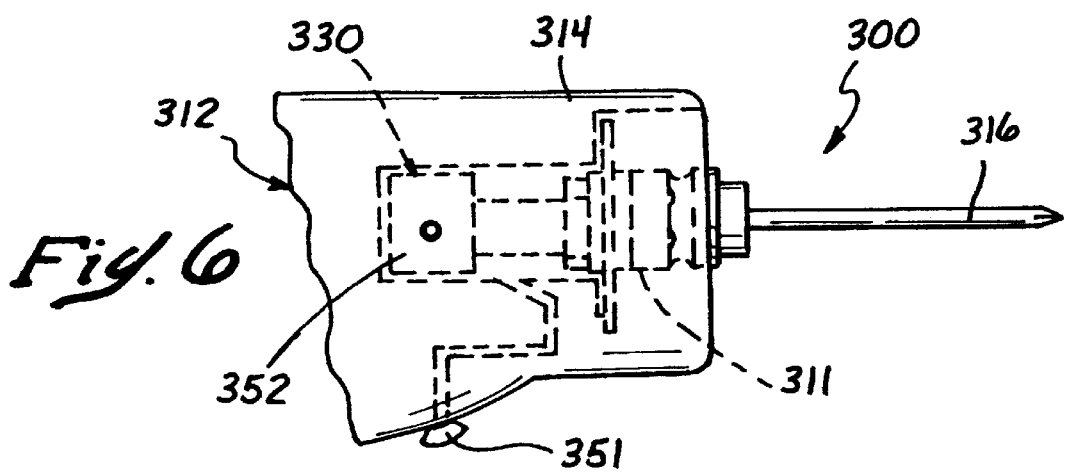
FIG. 6 is a side view of a third drill constructed according to the invention with a pneumatic quick-release actuator.

FIG. 6 shows a forward portion of yet another rotary power unit 300 constructed according to the invention. It is also similar in many respects to the rotary power unit 100 and so only differences are described in further detail. For convenience, reference numerals designating parts of the rotary power unit 300 are increased by two hundred over those designating parts of the rotary power unit 100. The entire housing 312 is not shown for illustrative convenience because its handle portion trigger, and related construction details are similar to those of the rotary power unit 100 in all germane respects.

The major difference is that the actuator assembly 330 of the rotary power unit 300 includes pneumatically powered means for enabling the user to operate the sleeve 317 of the quick-release chuck assembly 311 with a hand of the user while that hand of the user is holding the handle portion of the housing 312. The pneumatically powered means includes a switch 351 that the user manually actuates to connect pneumatic pressure to a piston arrangement 352 within the distal end portion 314 of the housing 312. The switch 351 is located on the housing 312 in a position such that the user can operate it with the index finger of his hand while that hand holds the handle portion of the housing 312. The piston arrangement 352 and its connection to the switch 351 are shown diagrammatically in FIG. 6. The piston arrangement 352 is adapted to move the sleeve 317 to the unlocked position in response to pneumatic pressure (e.g., air or hydraulic) when the user actuates the switch 351. Based upon the foregoing and subsequent descriptions, one of ordinary skill in the art can readily design a suitable piston arrangement to implement this aspect of the invention.

Figure 7:
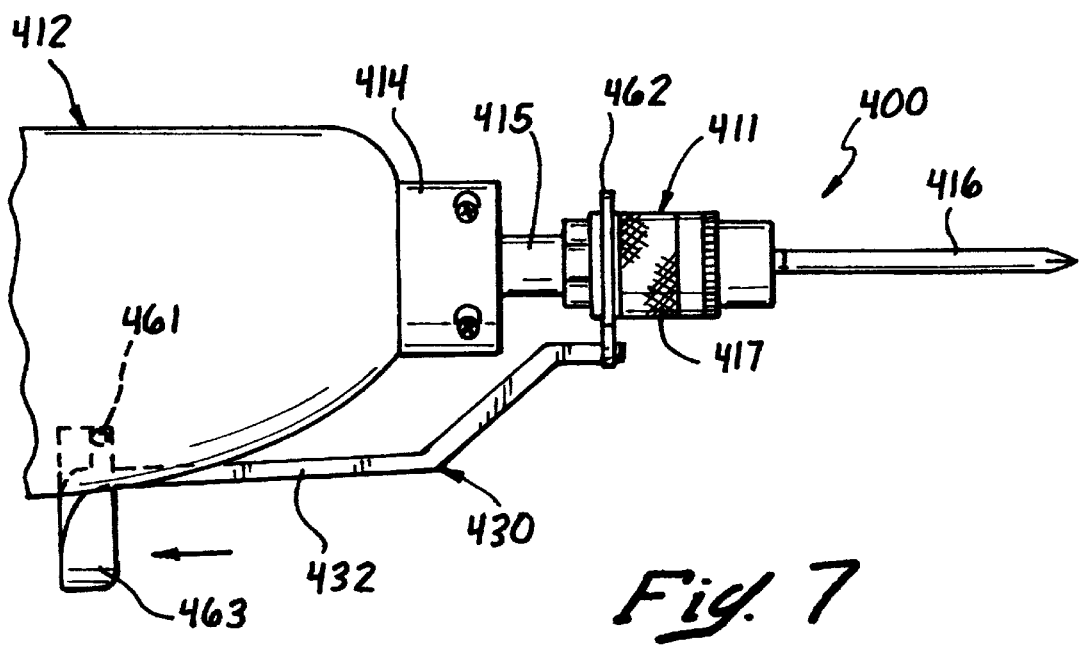
FIG. 7 shows the cutting edge configuration of a third embodiment of the invention.

FIG. 7 shows a forward portion of still another rotary power unit 400 constructed according to the invention. It is also similar in many respects to the rotary power unit 100 and so only differences are described in further detail. For convenience, reference numerals designating parts of the unit 400 are increased by three hundred over those designating parts of the rotary power unit 100. The entire housing 412 is not shown for illustrative convenience because its handle portion trigger, and related construction details are similar to those of the rotary power unit 100 in all germane respects.

Similar to the actuator assembly 130 of the rotary power unit 100, the actuator assembly 430 of the rotary power unit 400 includes means for enabling a user to operate the sleeve 417 of the quick-release chuck assembly 411 manually. The linkage member 432 is sized and attached to the housing 412 pivotally at reference numeral 461. The linkage member 461 extends to a coupling member 462 in the form of a ring seated loosely in an annular groove in the sleeve 417. The annular groove is akin to the annular groove 134 in the sleeve 117 shown in FIG. 4 and so it is not illustrated in detail in FIG. 7. Pulling a trigger member 463 causes the sleeve 417 to move rearwardly to the unlocked position. Releasing the trigger member 463 allows the sleeve 417 to return to a locked position under influence of spring biasing.

Thus, the invention provides a handheld rotary power unit having (i) a quick-release chuck assembly and (ii) a companion quick-release chuck actuator that is operable with a hand while that hand is holding the unit's handle. The user need not prop the unit against his belt or torso. He can hold the unit apart from his body or other support and operate the quick-release chuck assembly by means of the quick-release chuck actuator with one hand while he inserts or removes the bit with the other hand. Although exemplary embodiments have been shown and described, one of ordinary skill in the art may make many changes, modifications, and substitutions without necessarily departing from the spirit and scope of the invention.

What is claimed is:

1. A handheld rotary power unit, comprising:

a housing, the housing having a handle portion and a distal end portion;

a motor shaft extending through the distal end portion of the housing;

a quick-release chuck assembly connected to the motor shaft, the quick-release chuck assembly having a sleeve that is spring biased in a locked position of the sleeve, said quick-release chuck assembly being adapted to enable a user to move the sleeve axially to an unlocked position of the sleeve for purposes of inserting and removing a bit in the quick-release chuck assembly, and to then allow the sleeve to return to the locked position of the sleeve;

an actuator assembly on the housing that functions as means for enabling the user to operate the quick-release chuck assembly with a hand of the user while that hand of the user is holding the handle portion of the housing in order to thereby move the sleeve axially to the unlocked position of the sleeve;

a solenoid portion of the actuator assembly that is adapted to move the sleeve to the unlocked position of the sleeve when the solenoid portion of the actuator assembly is energized; and a switch portion of the actuator assembly that is adapted to couple electric power to the solenoid portion when the user actuates the switch portion;

said switch portion of the actuator assembly being located on the housing in a position enabling the user to actuate the switch portion with a finger of the hand holding the handle portion of the housing.

2. A handheld rotary power unit, comprising:

a housing, the housing having a handle portion and a distal end portion;

a motor shaft extending through the distal end portion of the housing;

a quick-release chuck assembly connected to the motor shaft, the quick-release chuck assembly having a sleeve that is spring biased in a locked position of the sleeve, said quick-release chuck assembly being adapted to enable a user to move the sleeve axially to an unlocked position of the sleeve for purposes of inserting and removing a bit in the quick-release chuck assembly, and to then allow the sleeve to return to the locked position of the sleeve;

an actuator assembly on the housing that functions as means for enabling the user to operate the quick-release chuck assembly with a hand of the user while that hand of the user is holding the handle portion of the housing in order to thereby move the sleeve axially to the unlocked position of the sleeve;

a pneumatically powered piston portion of the actuator assembly that is adapted to move the sleeve to the unlocked position of the sleeve when the pneumatically powered piston portion of the actuator assembly is energized; and a switch portion of the actuator assembly that is adapted to connect pneumatic pressure to the pneumatically powered piston portion when the user actuates the switch portion;

said switch portion of the actuator assembly being located on the housing in a position enabling the user to actuate the switch portion with a finger of the hand holding the handle portion of the housing.

* * * * *